Figure 1:
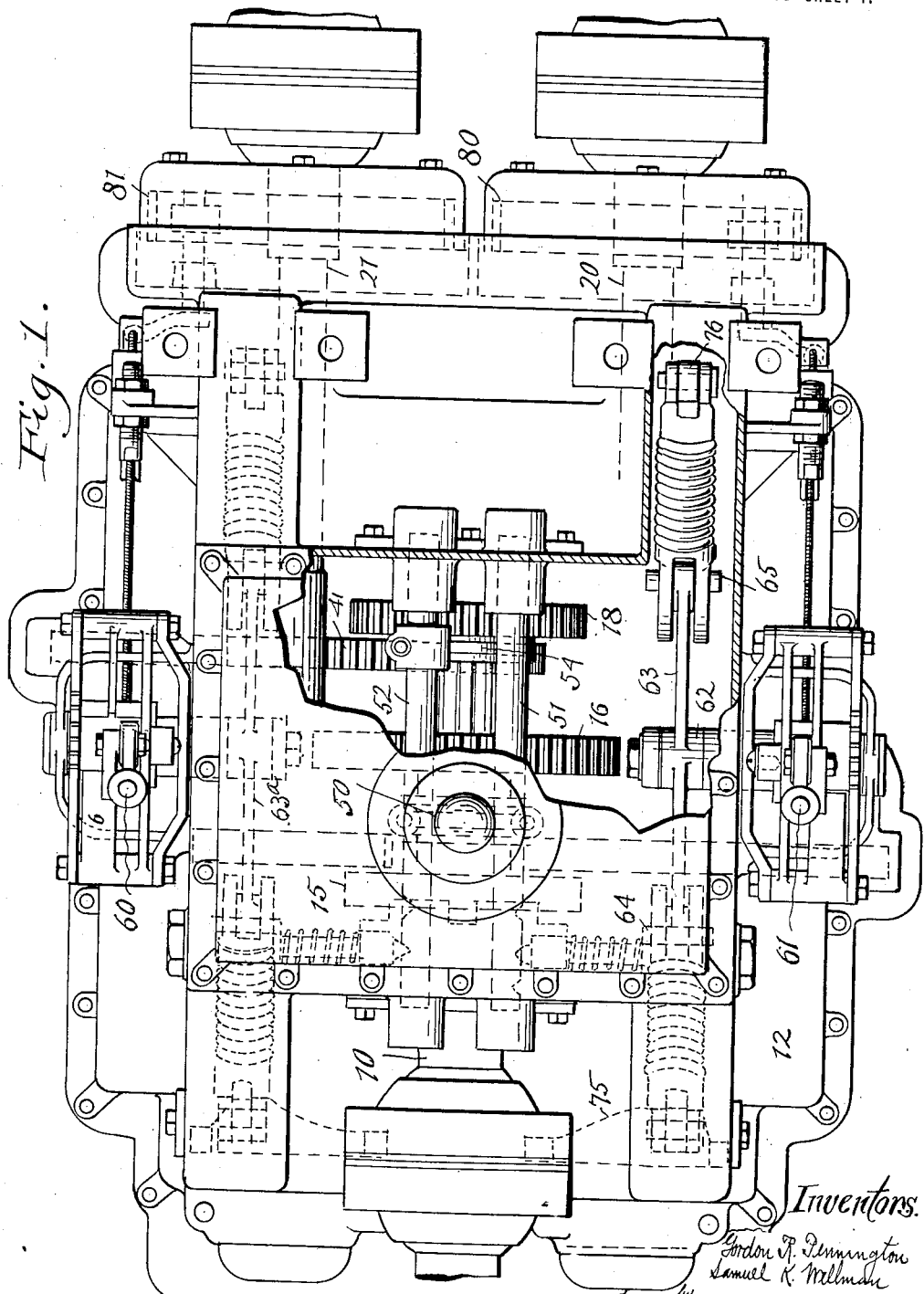

G. R. PENNINGTON AND S. K. WELLMAN.
TRANSMISSION MECHANISM.
APPLICATION FILED DEC. 5, 1919.

1,389,692.

Patented Sept. 6, 1921.
4 SHEETS—SHEET 1.

Inventors.
Gordon R. Pennington
Samuel K. Wellman
by
Thurston Kwis & Hudson
Attorneys

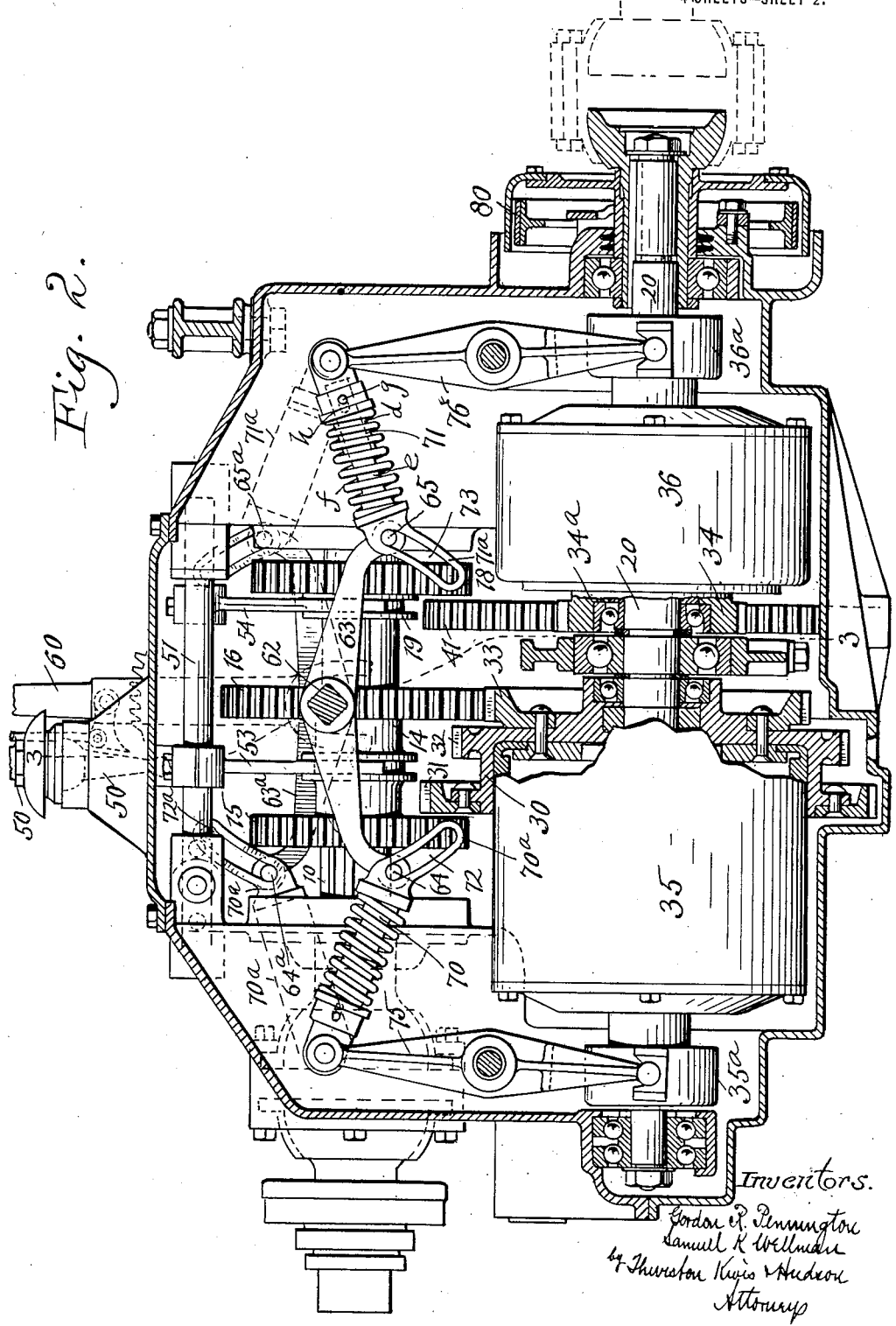

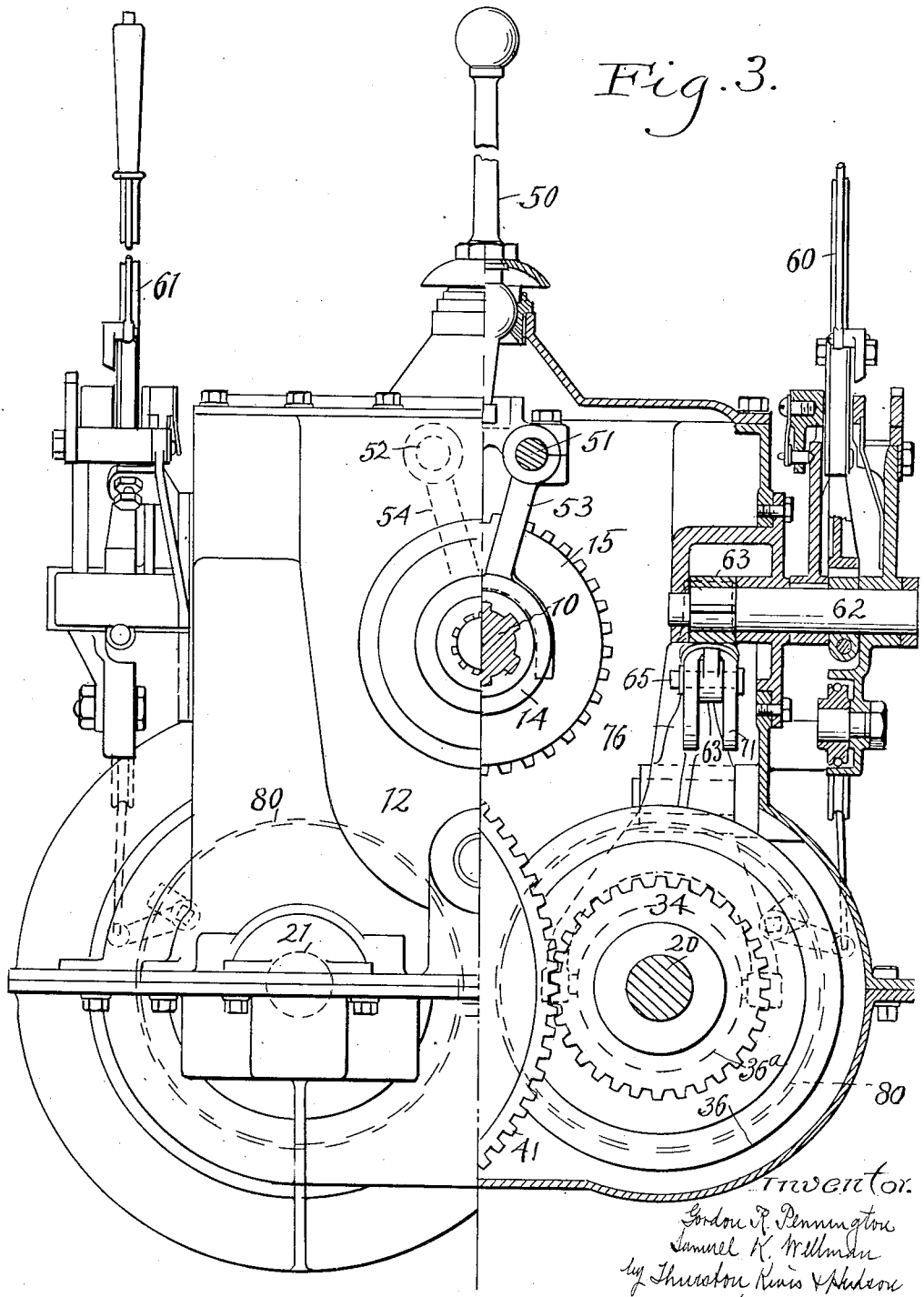

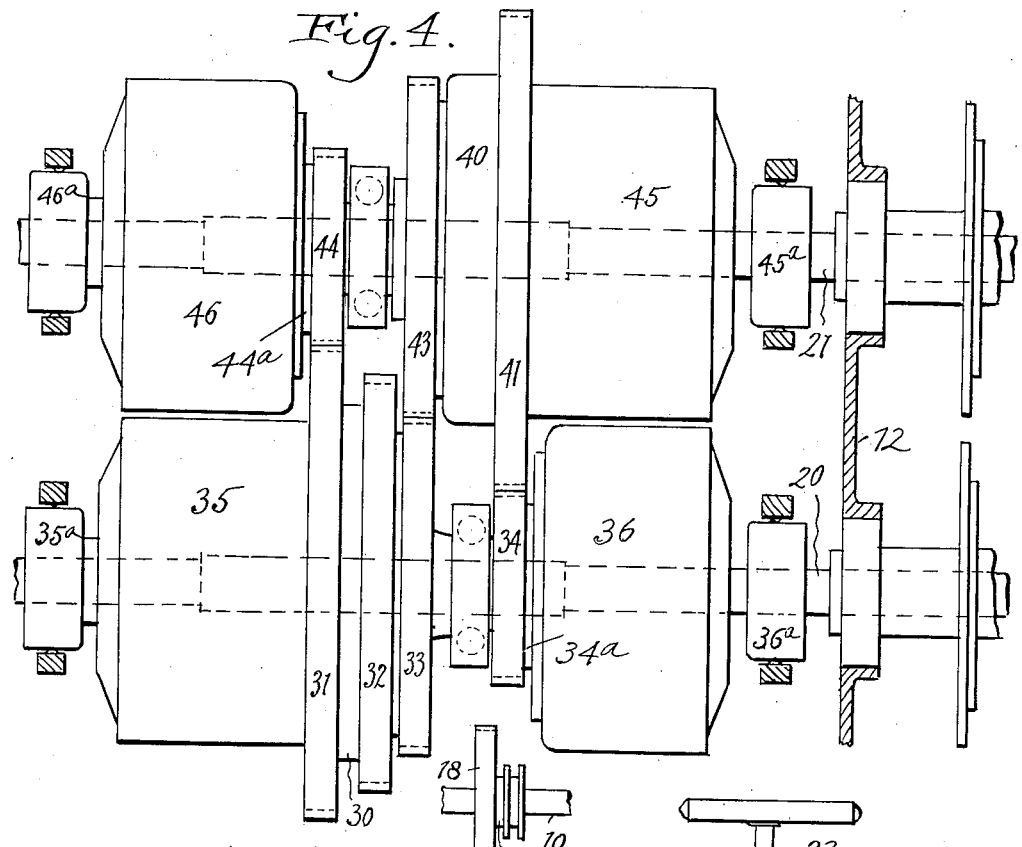

UNITED STATES PATENT OFFICE.

GORDON R. PENNINGTON, OF CLEVELAND, AND SAMUEL K. WELLMAN, OF CLEVELAND HEIGHTS, OHIO.

TRANSMISSION MECHANISM.

1,389,692.  Specification of Letters Patent.  Patented Sept. 6, 1921.

Application filed December 5, 1919. Serial No. 342,625.

*To all whom it may concern:*

Be it known that we, GORDON R. PENNINGTON and SAMUEL K. WELLMAN, citizens of the United States, and residents, respectively, of Cleveland, in the county of Cuyahoga and State of Ohio, and Cleveland Heights, in the county of Cuyahoga and State of Ohio, have invented a certain new and useful Improvement in Transmission Mechanism, of which the following is a full, clear, and exact description.

This invention relates to variable speed transmission mechanism for use on motor vehicles and more particularly on track laying tractors which have two endless track belts located respectively on opposite sides of the main frame.

The object of the invention is to provide compactly arranged and easily controlled mechanism through which power from a single driving shaft may be so transmitted to two driven shafts (which are properly connected with the two driving wheels of the vehicle) that said two shafts may be driven forward or backward at either of several speed ratios relative to the driving shaft, and so that also either driven shaft may be driven forward or backward at several speeds relative to the other driven shaft for the purpose of steering the vehicle and controlling its turning radius.

The invention consists in the construction and combination of parts shown in the drawing and hereinafter described and pointed out definitely in the appended claims.

In the drawing, Figure 1 is a plan view of the invention with a part of the inclosing casing broken away to better disclose some of the parts therein; Fig. 2 is a side elevation partly sectioned; Fig. 3 is a front elevation partly sectioned on the bent line 3—3 on Fig. 2; Fig. 4 is a plan view of the two driven shafts and associated parts and Fig. 5 is a diagrammatic view of the mechanism.

Referring to the parts by reference characters, 10 represents the driving shaft of the transmission mechanism; and 20, 21, represent respectively the two driven shafts of the transmission mechanism. These shafts are mounted in a casing 12, the main function of which is to support these shafts and to inclose and protect gearing through which the driving shaft rotates the driven shafts. The three shafts mentioned are parallel; and the driving shaft is disposed above and midway between the two driven shafts which are located in the same horizontal plane. This disposition of the shafts is not essential to the invention, broadly considered, but it is advantageous for several reasons which will be apparent, the chief of which being that thereby the mechanism may be made to occupy very little space. It is also the intention that when the mechanism is applied to a vehicle the three shafts referred to shall extend longitudinally thereon.

The driving shaft 10 projects forward out of the casing; and any suitable connection may be made between its front end and the motor. The two shafts 20, 21, project out of the rear end of the casing; and any suitable mechanism may be employed to transmit motion from these two driven shafts respectively to the two driving wheels 22, 23, of the vehicle. For example, the bevel gears 24, 25, may be secured respectively to the rear ends of the two driven shafts; they may mesh respectively with gears 26, 27; and these gears may be respectively fixed to the two axle shafts 28, 29, to which the two driving wheels 22, 23, are secured.

In a track laying tractor the two driving wheels 22, 23, will be sprocket wheels which will respectively engage the two endless track belts.

A gear sleeve 30 is loosely mounted on the driven shaft 20. It carries three gears, to wit, gears 31, 32, and 33, of which the latter is always in mesh with a gear 43 of the same diameter which is fixed to a gear sleeve 40. This gear sleeve is rotatably mounted on shaft 21, and it also carries a gear 41 which is always in mesh with a small gear 34 carried by the gear sleeve 34ª which is rotatably mounted upon shaft 20. A small gear 44 which is part of a gear sleeve 44ª is loosely mounted on shaft 41, and is always in mesh with gear 31. The small gears 34, 44, are of the same diameter.

It is apparent, therefore, that when either of the four gear sleeves mentioned is turned, the other three must also turn. It is also apparent that the two gear sleeves on shaft 20 turn in the same direction but at different rates; and that the two gear sleeves on shaft 21 turn at different rates but in the same direction, which direction is the opposite direction to that in which the two first mentioned gear sleeves turn. Likewise, the two smaller gears 34, 44, will turn at the same rate, but in opposite directions; and the two gear sleeves 30, 40, will turn at the same rate but in opposite directions.

On the driving shaft 10 are two sliding gear sleeves 14 and 19, and these gear sleeves are splined to the shaft. The gear sleeve 14 carries two gears 15, 16, of different sizes. By sliding gear sleeve 14 in one direction the gear 16 thereon will mesh with gear 32 on the gear sleeve 30, whereby all of the four gear sleeves on the two driven shafts will rotate at what may be called fast speed. If the gear sleeve 14 be moved on the driving shaft in the opposite direction, it will cause gear 15 to mesh with gear sleeve 31 on the gear sleeve 30 and thereby all of the four gear sleeves will turn at slow speed. In either event, however, said four gear sleeves will turn in what may be called the forward direction, to wit, the direction in which they must turn to cause the driving wheels 22, 23, to turn forward.

The other gear sleeve 19 carries the reverse gear 18. This may be moved along the driving shaft to cause reverse gear 18 to engage or disengage a gear 41 on the gear sleeve 40. When these two gears are in mesh the four gear sleeves on the driven shafts will be turned in the reverse direction, i. e., in the direction in which they will, when clutched to the driven shaft, cause the driving wheels 22, 23, to turn backward.

Any suitable mechanism may be employed to selectively move these two gear sleeves forward or backward for the purposes stated. The drawing shows two sliding gear shifters 51, 52, of which the former has a fork arm 53 engaging gear sleeve 14 while the latter has a fork arm 54 which engages gear sleeve 19. A pivoted operating lever 50 capable of swinging forward and backward or sidewise may be provided; by swinging this lever sidewise in one direction or the other its lower end may be caused to selectively engage one or the other of the sliding gear shifters 51, 52. Then by swinging this lever forward or backward the associated gear sleeves 14 and 18 may be moved lengthwise of the driving shaft to bring about the desired results.

It might be here stated that there is nothing new in this particular gear shifting mechanism shown and described and any other suitable gear shifting mechanism may be employed in its stead.

There are four clutches 35, 36, 45, 46, by which the operator may at will, through suitable mechanism, clutch the several gear sleeves 30, 40, 34ª, 44ª of the driven shafts, on which they are loosely mounted. As before stated these clutches may be of any suitable construction, and each may be operated by a sliding sleeve suitable for the purpose.

The clutch 35 is associated with a sliding operative sleeve 35ª, and the function of this clutch is to clutch and unclutch the driven shaft 20 and the gear sleeve 30. The clutch 36 is also associated with a sliding operating sleeve 36ª, and the function of this clutch is to clutch and unclutch the driven shaft 20 and the gear 34. The shaft 45 is also associated with the sliding operating sleeve 45ª, and the function of this clutch is to clutch and unclutch the gear sleeve 40 on the driven shaft 21. The clutch 46 is likewise associated with the sliding operating sleeve 46ª, and the function of this clutch is to clutch and unclutch the gear sleeve 44 on the driven shaft 21.

Any mechanism may be employed for selectively operating the four clutches, that is to say, the present invention is wholly independent of the clutch operating mechanism, and there are a great variety of mechanisms available for the purpose. The drawing, however, shows mechanism for this purpose which is believed to be novel, and which has been made the subject matter of our copending application, Serial No. 342,626, filed December 5, 1919. This mechanism includes two operating levers 60, 61, located adjacent opposite sides of the main frame and in positions convenient for the driver. The lever 60 controls the operation of the two clutches 35, 36, and the lever 61 controls the operation of the two clutches 45, 46. The two clutch operating mechanisms are similar, although not exactly alike, for certain reasons which will be explained.

Associated with the lever 60 is a rock shaft 62 to which said lever is fixed. A two arm rocker 63 is secured to this rock shaft; and, at the downturned ends of its two equal arms, it carries laterally extended pins 64, 65, which respectively project into slots 72, 73, formed in projections 70ª, 71ª of the links 70, 71, respectively. The link 70 is pivotally connected with the upper end of a clutch operating lever 75 which has an operative connection with the sliding sleeve 35ª of the clutch 35. The link 71 has a pivotal connection with the upper end of the clutch operating lever 76 which has an operative engagement with the sliding sleeve 36ª of the clutch 36.

By rocking forward the lever 60 the toggle, which includes the link 71 and associated rocker arm will be straightened, and associated lever 76 will be rocked in the direction which will cause the high speed clutch 36 to be closed; thereby connecting gear 34 with the shaft 20. As lever 63 rocks to produce this action, the pin 65 in its rear end will engage the end of the slot 73 and therefore the toggle will be straightened as stated;

but while this action is taking place, the forward arm of the lever 63 is not producing any effect upon the other toggle formed by it and the link 70 because pin 64 simply slides in the curved slot 72 in the toggle link 70,—said slot being formed on a curve of which the axis of shaft 62 is the center.

When, however, the lever 60 is pulled backward from the normal central position, it will straighten the front toggle, of which the link 70 is a part, and thereby close the low speed clutch 35; but in so doing the pin 65 in the rear end of the lever 63 will slide through slot 73 and therefore the toggle of which the link 71 is a part will not be operated.

It will be noted that the lever 63 has its ends turned downward, and that both of the links 70, 71, incline downward from their points of connection with the two clutch operating levers 75, 76. On the other side of the machine and associated with the lever 61 is another similar rock shaft to which is attached a rocker 63ª. The ends of this rocker are turned upward. Associated with this rocker are two links 70ª, 71ª, which incline upward from their points of connection with their clutch operating levers 75ª, 76ª. This slight difference in the construction of the two levers 63, 63ª, and of the disposition of the associated links 70, 70ª, and 71, 71ª, is so that the operator by pushing forward on both levers 60, 61, will close the two high speed clutches, and by pulling backward the two levers 60, 61, will close the two low speed clutches 35, 45.

If, therefore, the operator desires that the tractor shall move forward in a straight path, but at high speed, he will by the actuation of the lever 50 cause the gear 16 to intermesh with the gear 32. He will then by actuating the clutches 36, 46, seat the two high speed clutches, whereupon both shafts 20, 21, will rotate at the same (highest) speed in the forward direction. Or he may when the gear sleeve 14 is in the position stated seat the two low speed clutches 35, 45, whereupon both shafts 20, 21, will rotate in the forward direction at the same but slower speed. The operator may if he desires use different speed by moving the gear sleeve 14 so as to cause gear 15 to intermesh with gear 31, and then he may seat both of two high speed clutches or both of two low speed clutches, and thereby drive the two shafts 20, 21, at two different like speeds, but slower than before. If the operator wishes to reverse the operation of the machine he may do that by sliding the gear 18 into mesh with gear 41, and then he may drive both shafts 20, 21, in the reverse direction at either of two speeds by selectively operating the clutch.

In order to steer the vehicle whether it is going forwardly or backwardly, it is necessary that the two shafts 20, 21, be rotated at different speeds. Obviously this may be done by selectively operating the clutches, that is to say, one may close the low speed clutch associated with either shaft and the high speed clutch associated with the other shaft.

It is likewise possible to seat either clutch on one shaft and leave the other shaft disconnected from the driving mechanism. Brakes 80, 81, are provided for the two driven shafts, so that when either one of them is disconnected, its rotation may be quickly and completely stopped. Since any brakes and brake operating mechanism may be employed for this purpose, it is not thought necessary to describe the particular brake shown.

Numerous changes may be made in the specific mechanism shown without departing from the invention, provided they employ the combinations of the parts or the equivalents of the parts specified in the appended claims.

Having described our invention, we claim:

1. In transmission mechanism, the combination of a driving shaft, two parallel driven shafts, four gear sleeves which are loosely mounted, two on one driven shaft and two on the other driven shaft, and which are intergeared with one another whereby all must rotate when any one is rotated, means through which motion may be transmitted from the driving shaft to one of said gear sleeves, a clutch associated with each gear sleeve, and means for selectively operating said clutches to connect the driven shafts with either of the gear sleeves loosely mounted thereon.

2. In transmission mechanism, the combination of a driving shaft, two parallel driven shafts, and four gear sleeves which are loosely mounted, two on one driven shaft and two on the other driven shaft and are intergeared with one another whereby all must rotate when any one is rotated, gearing adapted to be rendered operative at will for transmitting motion at either of two speeds from the driving shaft to one of said gear sleeves, a clutch associated with each gear sleeve, and means for selectively operating said clutches to connect either gear sleeve with the shaft on which it is mounted.

3. In transmission mechanism, the combination of a driving shaft, two parallel driven shafts, and four gear sleeves which are loosely mounted,—two on one driven shaft and two on the other, and are intergeared with one another whereby all must rotate when any one is rotated, gearing adapted to be selectively operated through which the driving shaft may drive one of said gear sleeves backward or at either of two speeds forward, clutches associated one with each gear sleeve, and means for selectively operating said clutches to connect either gear sleeve with the shaft on which it is mounted.

4. In transmission mechanism, the combination of a driving shaft and two parallel driven shafts, with two gear sleeves rotatably mounted on one driven shaft of which one of said gear sleeves is a plural gear sleeve, that is, a gear sleeve having more than one gear, two gear sleeves which are loosely mounted on the other driven shaft one of said gear sleeves being a plural gear sleeve, each plural gear sleeve having a gear which is in mesh with a gear on the other plural gear sleeve and having another gear which is in mesh with the other gear sleeve on the other driven shaft, a clutch associated with each of said four gear sleeves, means for selectively operating said clutches to connect each driven shaft with either of the two gear sleeves loosely mounted thereon, and gearing for transmitting motion from the driving shaft to one of said plural gears.

5. In transmission mechanism, the combination of a driving shaft and two parallel driven shafts with two gear sleeves rotatably mounted on one driven shaft of which one of said gear sleeves is a plural gear sleeve, that is, a gear sleeve having more than one gear, two gear sleeves which are loosely mounted on the other driven shaft one of said gear sleeves being a plural gear sleeve, each plural gear sleeve having a gear which is in mesh with a gear on the other plural gear sleeve and having another gear which is in mesh with the other gear sleeve on the other driven shaft, a clutch associated with each of said four gear sleeves, means for selectively operating said clutches to connect each driven shaft with either of the two gear sleeves loosely mounted thereon, and gearing adapted to be selectively operated through which the driving shaft may drive either one of said plural gears.

6. The combination of a driving shaft, two driven shafts, two sets of gear sleeves loosely mounted on each driven shaft there being a permanent intermeshing engagement between gears of one set on one driven shaft and the gears of another set on the other driven shaft and between a gear of the first set on one shaft the gear of the second set on the other shaft, and between a gear of the first set on the other shaft and a gear of the second set on the first shaft, clutches adapted to be independently operated, and means to transmit motion from the driving shaft to a gear set on one of the driven shafts.

7. The combination of two driven shafts and a parallel driving shaft arranged above and about midway between said driven shafts, a multiple gear sleeve loosely mounted on one of said driven shafts and carrying a plurality of gears, a gear sleeve carrying a single gear loosely mounted on the same driven shaft in front of the gear sleeve referred to, a multiple gear sleeve loosely mounted on the other driven shaft and having a plurality of gears one of which meshes with a gear on the first mentioned multiple gear sleeve and one of which meshes with the single gear on the first mentioned driven shaft, a gear sleeve loosely mounted on the second driven shaft and behind the first mentioned gear sleeve thereon,—said gear being permanently in mesh with a gear on the multiple gear sleeve first mentioned, clutches which are independently operable for connecting the several gear sleeves with the shafts on which they are loosely mounted, and means to transmit motion from the driven shaft to one of the multiple gear sleeves.

8. The combination of two driven shafts and a parallel driving shaft arranged above and about midway between said driven shafts, a multiple gear sleeve loosely mounted on one of said driven shafts and carrying a plurality of gears, a gear sleeve carrying a single gear loosely mounted on the same driven shaft in front of the gear sleeve referred to, a multiple gear sleeve loosely mounted on the other driven shaft and having a plurality of gears one of which meshes with a gear on the first mentioned multiple gear sleeve and one of which meshes with the single gear on the first mentioned driven shaft, a gear sleeve loosely mounted on the second driven shaft and behind the first mentioned gear sleeve thereon,—said gear being permanently in mesh with a gear on the multiple gear sleeve first mentioned, clutches which are independently operable for connecting the several gear sleeves with the shafts on which they are loosely mounted, means to transmit motion from the driven shaft to one of the multiple gear sleeves, and sliding gear sleeve on the driving shaft having splined connection therewith and having two gears adapted to be selectively brought into mesh with gears on one of the multiple gear sleeves.

9. The combination of two driven shafts and a parallel driving shaft arranged above and about midway between said driven shafts, a multiple gear sleeve loosely mounted on one of said driven shafts and carrying a plurality of gears, a gear sleeve carrying a single gear loosely mounted on the same driven shaft in front of the gear sleeve referred to, a multiple gear sleeve loosely mounted on the other driven shaft and having a plurality of gears one of which meshes with a gear on the first mentioned multiple gear sleeve and one of which meshes with the single gear on the first mentioned driven shaft, a gear sleeve loosely mounted on the second driven shaft and behind the first mentioned gear sleeve thereon,—said gear being permanently in mesh with a gear on the multiple gear sleeve first mentioned, clutches which are independently operable for connecting the several gear sleeves with the shafts on which they are loosely mounted, means to transmit motion from the driving shaft to one of the multiple gear sleeves, including two sliding gears on the driving shaft, one adapted to mesh with a gear on one multiple gear sleeve, and one adapted to mesh with a gear on the other multiple gear sleeve, and means to selectively operate the two gear sleeves on the driving shaft.

In testimony whereof, we hereunto affix our signatures.

GORDON R. PENNINGTON.
SAMUEL K. WELLMAN.